(12) United States Patent
Wang et al.

(10) Patent No.: US 12,481,816 B2
(45) Date of Patent: Nov. 25, 2025

(54) CONSTRAINT FILE-BASED NOVEL FRAMEWORK FOR NET-BASED CHECKING TECHNIQUE

(71) Applicant: Synopsys, Inc., Mountain View, CA (US)

(72) Inventors: Chao-Min Wang, Zhubei (TW); Ru-Lin Yang, Hsinchu (TW); Cheng-Lin Lee, Hsinchu (TW); Yuan-Wen Wang, Hsinchu (TW); Hung-Shih Wang, Hsinchu (TW)

(73) Assignee: Synopsys, Inc., Sunnyvale, CA (US)

( * ) Notice: Subject to any disclaimer, the term of this patent is extended or adjusted under 35 U.S.C. 154(b) by 763 days.

(21) Appl. No.: 17/829,300

(22) Filed: May 31, 2022

(65) Prior Publication Data

US 2022/0382955 A1    Dec. 1, 2022

Related U.S. Application Data

(60) Provisional application No. 63/195,201, filed on Jun. 1, 2021.

(51) Int. Cl.
G06F 30/398 (2020.01)
G06F 30/392 (2020.01)
G06F 111/04 (2020.01)

(52) U.S. Cl.
CPC .......... *G06F 30/398* (2020.01); *G06F 30/392* (2020.01); *G06F 2111/04* (2020.01)

(58) Field of Classification Search
CPC ... G06F 30/398; G06F 30/392; G06F 2111/04
USPC ................................................ 716/100
See application file for complete search history.

(56) References Cited

U.S. PATENT DOCUMENTS

| | | | | |
|---|---|---|---|---|
| 8,458,636 | B1* | 6/2013 | Balsdon | G06F 30/39 716/120 |
| 8,572,533 | B2* | 10/2013 | Ferguson | G06F 30/398 716/112 |
| 9,740,814 | B1* | 8/2017 | Ghosh | G03F 7/70433 |
| 9,922,161 | B2* | 3/2018 | Kahng | G06F 30/398 |
| 2011/0111330 | A1* | 5/2011 | Schultz | G03F 1/36 430/5 |
| 2012/0180014 | A1* | 7/2012 | Fang | G06F 30/398 716/112 |
| 2013/0132918 | A1* | 5/2013 | Ferguson | G03F 1/38 716/112 |
| 2013/0152032 | A1* | 6/2013 | Wei | G06F 30/398 716/112 |
| 2018/0089357 | A1* | 3/2018 | Pathak | G03F 7/70433 |
| 2020/0026820 | A1* | 1/2020 | Srivastava | G06F 18/22 |
| 2021/0064719 | A1* | 3/2021 | Wolpert | G06F 30/398 |

* cited by examiner

*Primary Examiner* — Suchin Parihar
(74) *Attorney, Agent, or Firm* — Patterson + Sheridan, LLP

(57) ABSTRACT

Net-based checking of a circuit design includes obtaining a circuit design comprising a plurality of polygons. Further, a shape of a first polygon of the plurality of polygons, and a shape of a second polygon of the plurality of polygons is determined. The shape of the first polygon differs from a shape of the second polygon. Violations within the circuit design are detected based on a comparison of the first polygon with the second polygon.

20 Claims, 9 Drawing Sheets

CONSTRAINT FILE-BASED NOVEL FRAMEWORK FOR NET-BASED CHECKING TECHNIQUE

RELATED APPLICATION

This application claims the benefit of U.S. provisional patent application Ser. No. 63/195,201, filed Jun. 1, 2021, which is hereby incorporated herein by reference.

TECHNICAL FIELD

The present disclosure relates to circuit designs verification, and more particularly to a net-based constraint driven verification of a circuit design using netted shapes.

BACKGROUND

Circuit designs are verified by analyzing the layout of the circuit design to ensure that an integrated circuit (IC) device manufactured from the circuit design functions properly. During the verification process, labels are assigned to nets within the circuit design layout to identify target nets to be protected and shielding nets which are used for protecting sensitive nets. In a circuit design, non-critical nets may be used to protect (e.g., shield) sensitive nets to provide efficient shielding without using a dedicated shielding layer. As, most non-critical nets might not be top level nets within the circuit design, and may not be used to protect sensitive nets, the nets that may be used to protect sensitive nets are identified during the design process.

SUMMARY

In one or more examples, a method includes obtaining a circuit design comprising a plurality of polygons. Further, the method includes determining a shape of a first polygon of the plurality of polygons, and a shape of a second polygon of the plurality of polygons. The shape of the first polygon differs from a shape of the second polygon. The method further includes detecting violations within the circuit design based on a comparison of the first polygon with the second polygon.

In one or more examples, a system includes a memory storing instructions, and one or more processors. The one or more processors are coupled with the memory and executes the instructions. The instructions when executed cause the one or more processors to obtain a circuit design comprising a plurality of polygons. The processors are further caused to determine a shape of a first polygon of the plurality of polygons, and a shape of a second polygon of the plurality of polygons. The shape of the first polygon differs from a shape of the second polygon. Further, the processors are caused to detect violations within the circuit design based on a comparison of the first polygon with the second polygon.

In one or more examples, a non-transitory computer readable medium including stored instructions, which when executed by a processor, cause the processor to obtain a circuit design comprising a plurality of polygons. The processor is further caused to determine a plurality of polygon collections based on shapes of the plurality of polygons. Each of the plurality of polygon collections is associated with a different one of the shapes. Further, the processor is caused to determine first polygons of a first polygon collection of the plurality of polygon collections that interact with one or more polygons of a second polygon collection of the plurality of polygon collections. The processor is further caused to determine a violation within the circuit design based on determining that the first polygons are free of holes.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to a framework for verifying a circuit design layout using a net-based checking process. The framework as described in the present disclosure uses a net-based checking processes that is divided in a data preparation process and a verification process. Dividing the net-based checking process into two different processes reduces the complexity of the overall process, reducing the corresponding processing requirements and time, and allows for the data preparation process and/or the verification process to be reused In one example, the net-based checking process is a design rule checking (DRC) process or a layout vs. schematic (LVS) process. A DRC process verifies as to whether a circuit design meets the constraints imposed by a process technology used to manufacture a corresponding circuit device from the circuit design. The DRC process ensures that the circuit design meets the manufacture requirements of the corresponding process technology. A LVS process compares an extracted netlist from a circuit design layout to an original schematic netlist to determine if there are any mismatches between the two. The comparison check is considered clean if all the devices and nets of the schematic match the devices and nets of the layout.

In one or more examples, to shield to sensitive nets (e.g., elements) within a circuit design, a circuit design is analyzed to determine nets that can be used to shield the sensitive nets. However, typical processes to identify nets that may be used to shield the sensitive nets is complex and error-prone. In the following, an improved net-based checking processes is described that uses a data preparation process and a verification process to identify nets that may be used to shield sensitive nets with reduced errors as compared to current methods for identifying such nets. The net-based checking process as described herein uses less processing requirements and processing time allows for as compared to conventional net-based checking processes.

Figure 1:
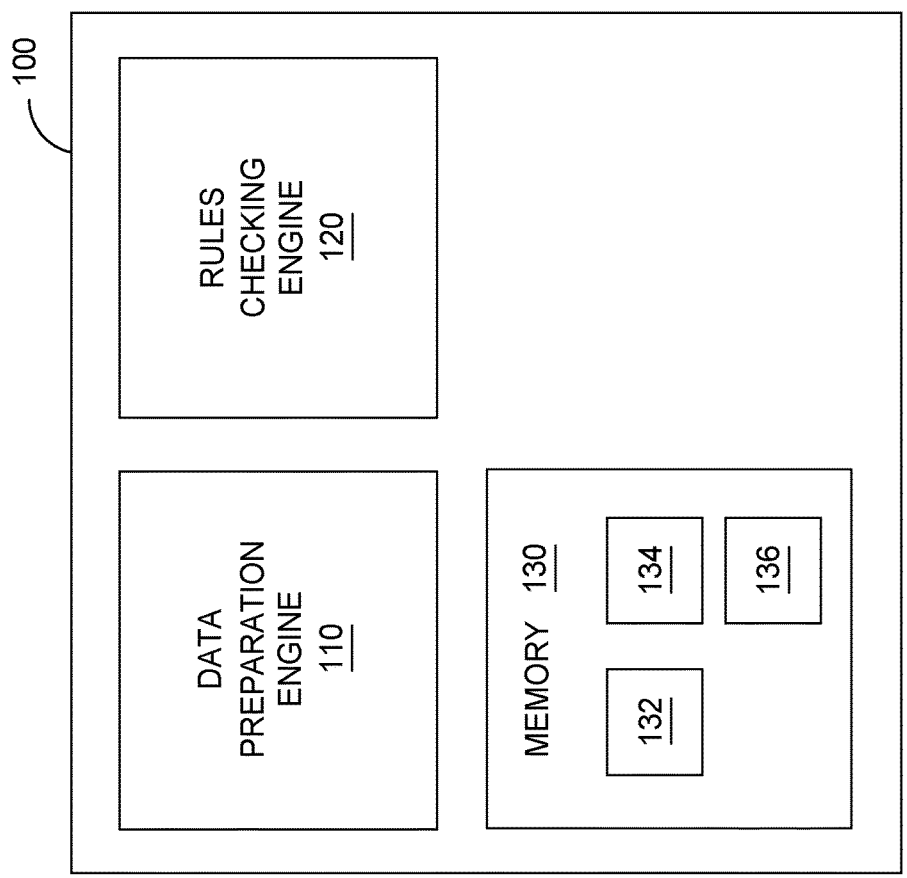
FIG. 1 illustrates a block diagram of a circuit verification system, according to one or more examples.

FIG. 1 illustrates a block diagram of a circuit design verification system 100, according to one or more examples. The circuit design verification system 100 may be an electronic design automation (EDA) verification system. The circuit design verification system 100 determines whether the layout of a circuit design (e.g., the circuit design 132) corresponds to the original schematic or circuit diagram of the circuit design. In one or more examples, the circuit design verification system 100 identifies and/or verifies nets of a circuit design that may be used to shield over nets. In one or more examples, the circuit design verification system 100 performs data preparation of a circuit design and design rule checking of the circuit design using the prepared data to verify a layout of the circuit design 132. The circuit design verification system 100 includes one or more processors (e.g., processing device 1002 of FIG. 10) that executes instructions (e.g., instructions 1026 of FIG. 10) stored in a memory (e.g., the memory 130, the main memory 1004 of FIG. 10 and/or the machine-readable medium 1024 of FIG. 10).

The circuit design verification system 100 includes a data preparation engine 110, a rules checking engine 120, and a memory 130. The data preparation engine 110 includes one or more processors (e.g., processing device 1002 of FIG. 10) that executes instructions (e.g., instructions 1026 of FIG. 10) stored in a memory (e.g., the memory 130, the main memory 1004 of FIG. 10 and/or the machine-readable medium 1024 of FIG. 10). The data processing engine 110 performs a data preparation via a DRC process and/or an LVS process to generate net data (e.g., polygon collections) to be used by the rules checking engine 120. The net data is stored within the memory 130. Further, the data processing engine 110 identifies nets that may be used to shield other nets within a circuit design.

Figure 10:
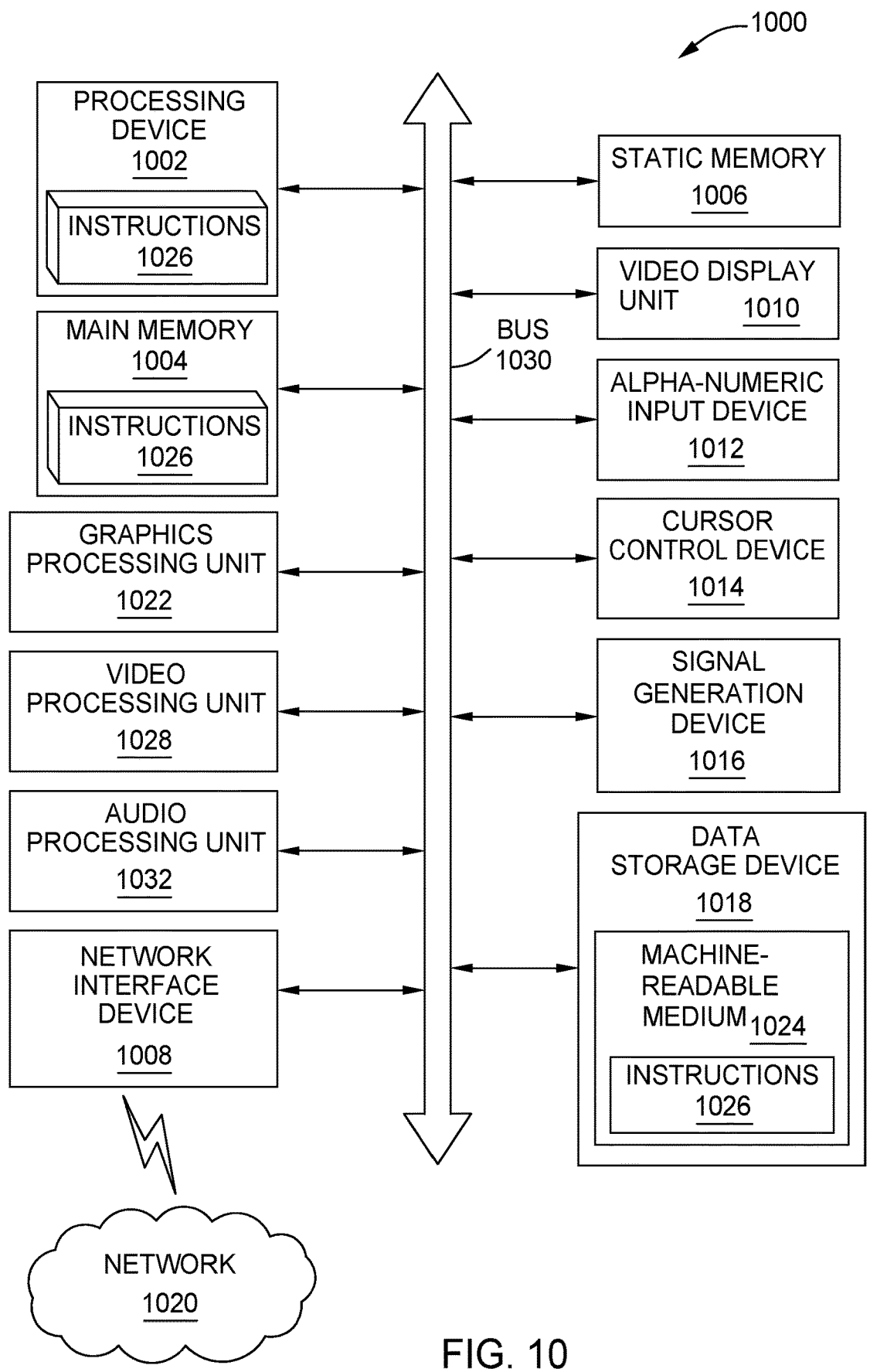
FIG. 10 depicts a diagram of an example computer system in which embodiments of the present disclosure may operate.

The rule checking engine 120 includes one or more processors (e.g., processing device 1002 of FIG. 10) that executes instructions (e.g., instructions 1026 of FIG. 10) stored in a memory (e.g., the memory 130, the main memory 1004 of FIG. 10 and/or the machine-readable medium 1024 of FIG. 10). The rules checking engine 120 receives the data generated by the data preparation engine 110 and determines whether any design rules are violate rules associated with the corresponding manufacturing process and/or technology process.

Figure 2:
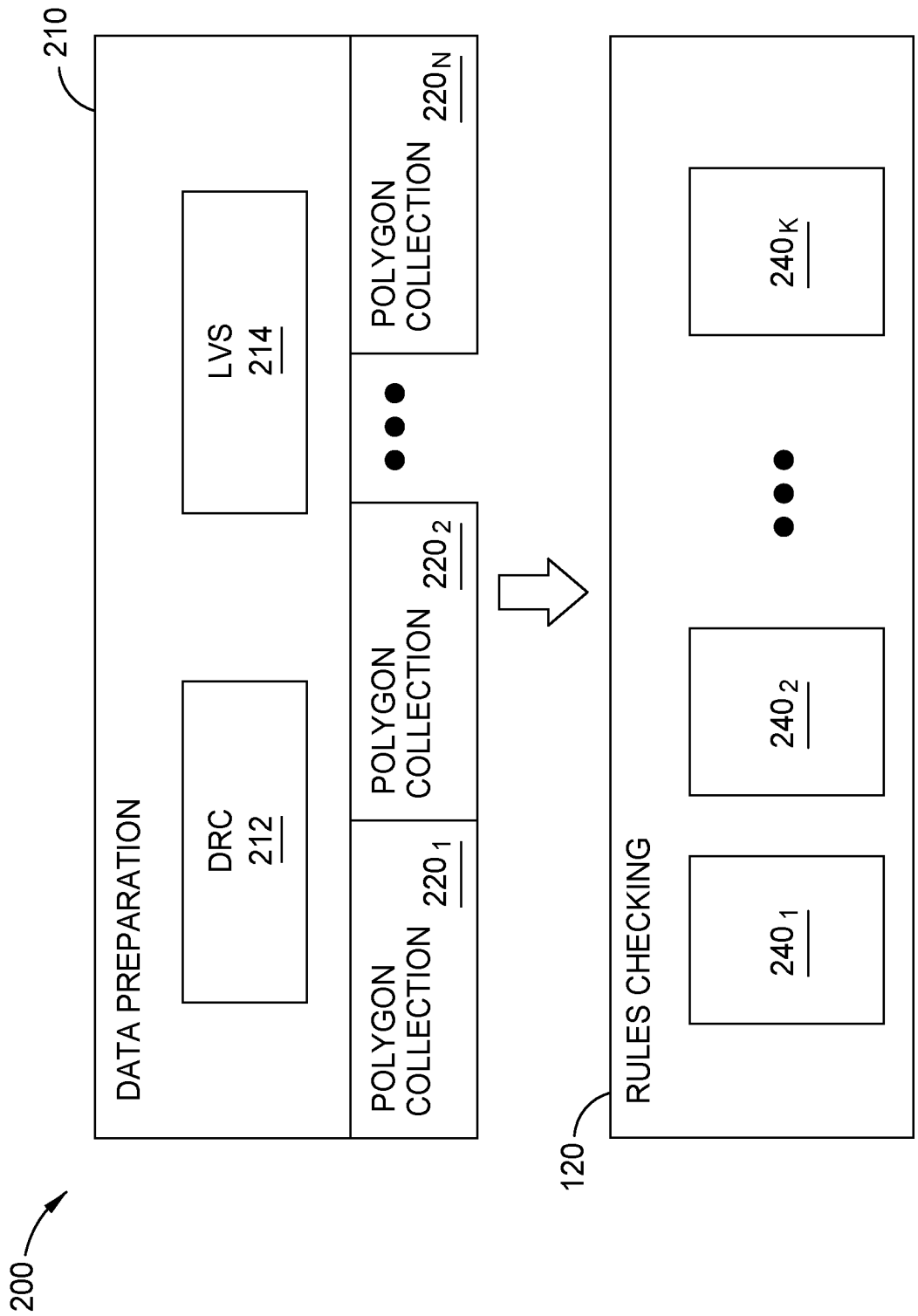
FIG. 2 illustrates a circuit verification framework, according to one or more examples.

In one example, the circuit design verification system 100 employs the framework 200 of FIG. 2 to perform data preparation process 210 and a rules checking process with the rules checking engine 120. The data preparation process 210 uses a DRC process 212 and/or an LVS process 214 to generate the polygon collections 220. In one example, the data preparation process 210 is performed by the data preparation engine 110.

In one example, the circuit design verification system 100 obtains the circuit design 132 from the memory 130. The circuit design 132 includes polygons (e.g., netted shapes) that represent circuit elements of the circuit design 132. The polygons correspond to patterns of metal, oxide, and/or semiconductor layers that form the components of a corresponding IC device.

In one example, a DRC process 212 is used to process the circuit design 132 to generate layer mapping and shape selection from the layout of the circuit design 132. The polygon collections 220 are determined from the layer mapping and shape selection generated by DRC process 212. The LVS process 214 is similar to the DRC process 212 and further performs data transformation, layer merger, shape query and collection to generate the polygon collections 220 (polygon collections $220_1$-$220_N$, where N is two or more). Each of the polygon collections corresponds to a different polygon shape. Accordingly, in one or more examples, the polygons making up each of the polygon collections have the same shape. The DRC process 212 is described in further detail with regard to the method 300 of FIG. 3 and the LVS process 214 process is described in further detail with regard to the method 500 of FIG. 5.

In one or more examples, one or more machine learning (ML) techniques may be applied to the DRC process 212 and/or LVS process 214 to determine the polygon collections 220. For example, the circuit design verification system 100 may employ one or more of logistic regression, neural networks, and others, to train a model which is then used to perform the DRC process 212 and/or the LVS process 314 to determine the polygon collections 220. For example, an ML model may be trained with DRC data that includes layout designs and associated text (e.g., labels), and/or with LVS data that includes layout design and associated text (e.g., labels), in addition to one or more circuit designs. In one or more examples, the ML model may be a generator to create meta-data from either the DRC process 212 and/or the LVS process 214, or mixed source as input for rules engine to execute net-based design rules checking. In one or more examples, for the source in the LVS process 214, the input fed into the rules checking engine 120 is a LVS clean design. For the source in DRC process 212, the input fed into the rules checking engine 120 contains text labels for net specification.

In the example of FIG. 2, the rules checking engine 120 includes one or more rule checking units (e.g., rule checking unit $240_1$, rule checking unit $240_2$, and rule checking unit $240_K$, wherein K is more than 2). In one example, each rule checking unit 240 is configured similar to the computer system 1000 of FIG. 10. Further, in one or more examples, each rule checking unit 240 is a self-contained unit. In one or more examples, distributed processing is applied by the rules checking engine 120 to check two or more rules during at least partially overlapping periods of time. For example, two or more rules may be checked by two or more rule checking engines 240 at least partially in parallel (e.g., during an at least partially overlapping period of time). Each of the rule checking units may be used to analyzing the polygons of the polygon collections 220 to detect violations within the circuit design 132.

Figure 3:
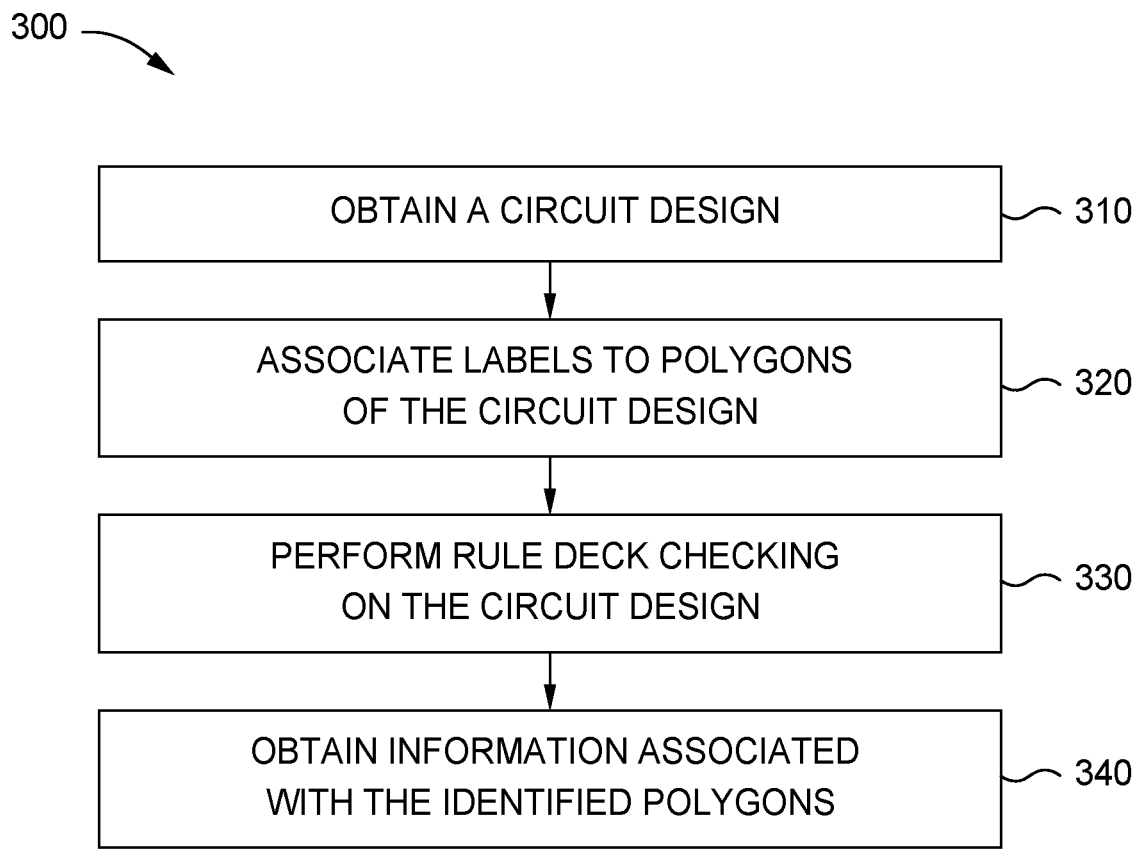
FIG. 3 illustrates a flowchart of a method for generating polygons collections, according to one or more examples.

FIG. 3 illustrates a flowchart of a method 300 for data preparation with regard to the DRC process 212 of FIG. 2. The method 300 is performed by the data processing engine 110. For example, one or more processors of the data processing engine 110 execute instructions stored in a memory to perform the method 200.

At 310 of the method 300, a circuit design (e.g., the circuit design 132) is obtained by the data processing engine 110. For example, the data processing engine 110 obtains the circuit design 132 from the memory 130, another engine within the circuit verification system 100, and/or a system external to the circuit verification system 100.

At 320 of the method 300, labels are associated with the polygons (nets) of the circuit design. In one example, the data preparation engine 110 associates the labels with the polygon shapes of the circuit design. In one or more examples, the circuit design 132 includes a plurality polygon and each polygon is associated with a label. In one example, the data preparation engine 110 associates the polygons with labels based on a constraint file. The constraint file (e.g., the constraint file 134) defines a relationship between each net (polygon), layer, and design rules (e.g., shield design spacing rule) among others. Further, the constraint file identifies critical nets.

At 330 of the method 300, rule deck checking is performed on the circuit design by the data preparation engine 110. For example, the data preparation engine 110 uses a rule deck file to perform rule deck checking to perform the DRC process. The rule deck file defines the shapes that are used to find and identify the polygons that are included (e.g., associated) with the polygon collections 220.

Figure 4:
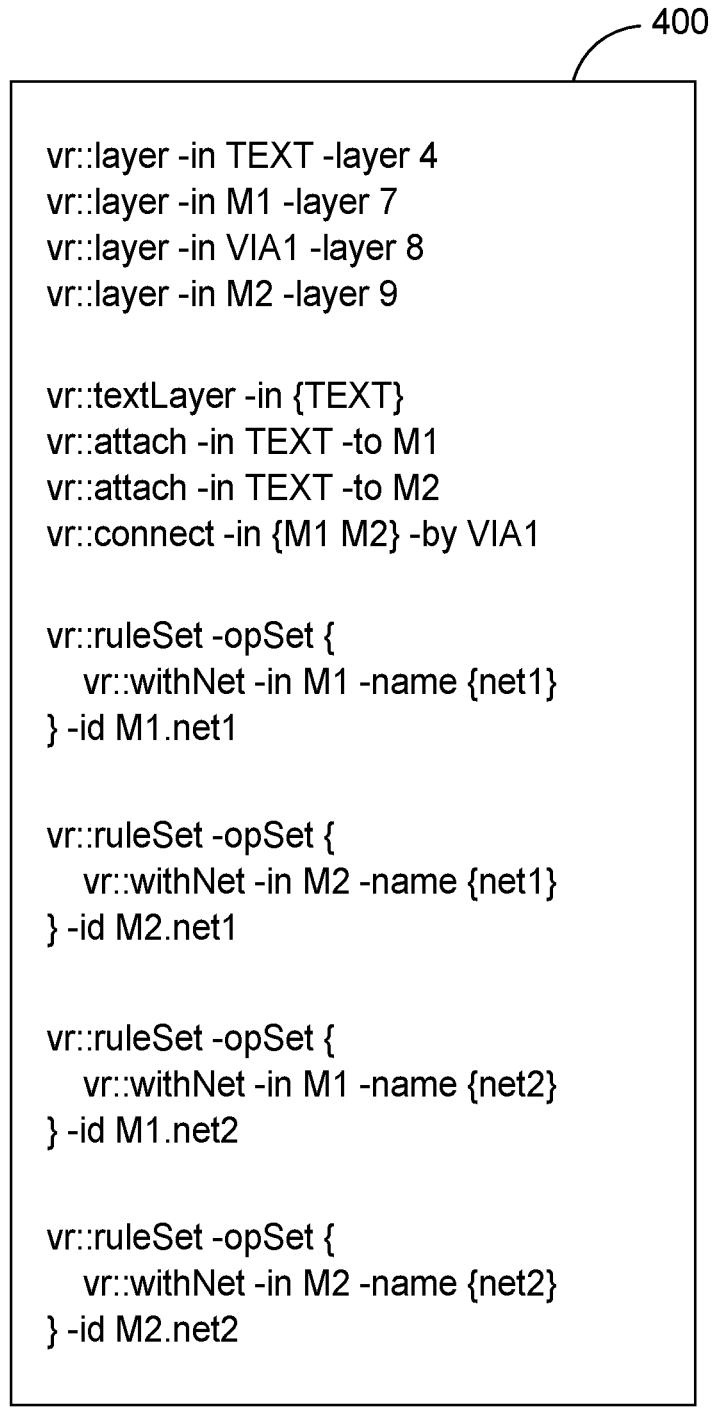
FIG. 4 illustrates an example rule deck file, according to one or more examples.

FIG. 4 illustrates the rule deck file 400. The rule deck file 400 includes rules to identify a first net "net1" with an M1/M2 layer and a second net "net2 with M1/M2 layer. In other examples, other rule deck files may be used to identify other nets. The data preparation engine 110 processes the circuit design with the rule deck file 400 to identify nets with the netted shape or shapes. The identified nets (e.g., polygons) are stored in a result file within the memory 130 as polygon collections 220.

At 340, information associated with the identified nets is obtained by the data preparation engine 110 from the result file stored in the memory 130. For example, the result file is parsed to identify information regarding the polygons of the identified nets is addressed within the result file.

In one or more examples, a ML model and a ML process to perform one or more of 320, 330, and 340 of the method 300. For example, layouts of a plurality of circuit designs may be collected over time and used to train an ML model to be used during the method 300. For the layout design of each circuit design, a specific DRC rule deck file based on the DRC rule deck template and design data is generated by the data preparation engine 110 using the trained ML model. In one example, the generated rule-decks/runsets are used to train the ML model. If the generated rule-deck/runset is incorrect, the defects are also used to train the ML model.

Figure 5:
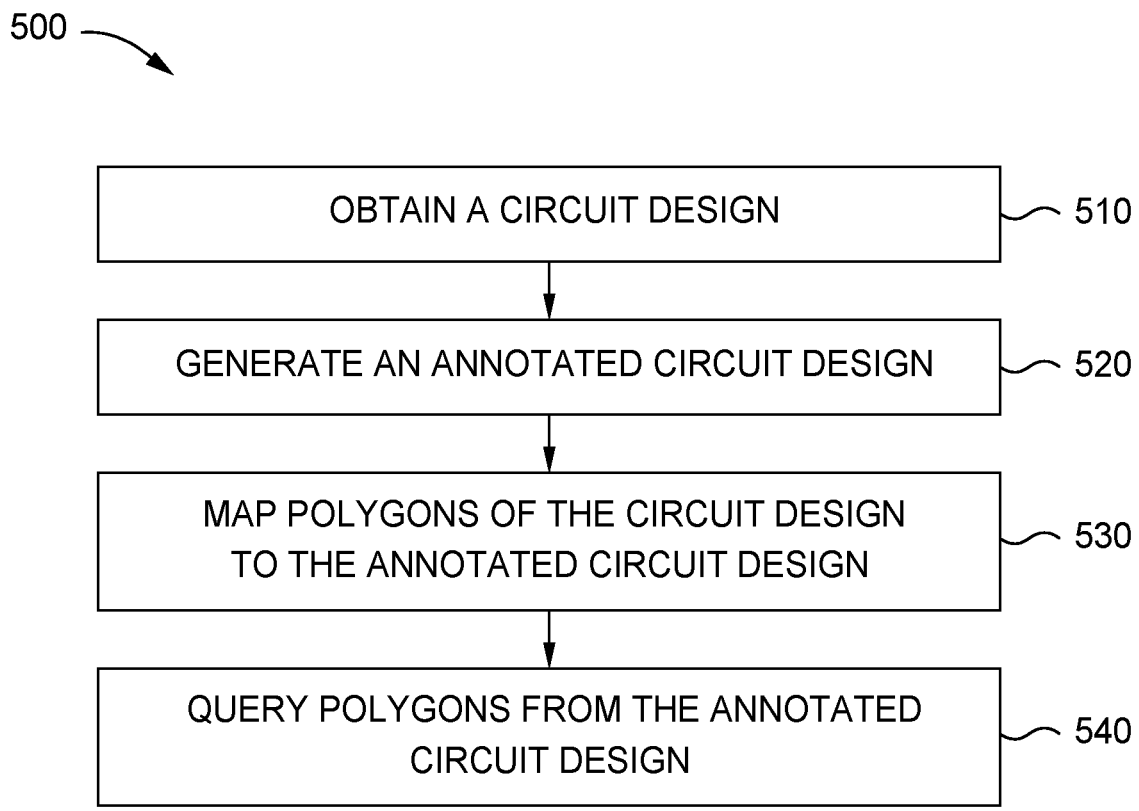
FIG. 5 illustrates a flowchart of a method for generating polygons collections, according to one or more examples.

FIG. 5 illustrates a flowchart of a method 500, according to one or more examples. The method 500 is performed by the data processing engine 110. For example, one or more processors of the data processing engine 110 execute instructions stored in a memory to perform the method 500. In one example, the data processing engine 110 performs the method 500 to identify polygon collections (e.g., polygon collection 220) to be used by the rules checking engine 120 for verification of a layout of the circuit design 132.

At 510 of the method 500, a circuit design (e.g., the circuit design 132) is obtained by the data processing engine 110. For example, the data processing engine 110 obtains the circuit design 132 from the memory 130, another engine within the circuit verification system 100, and/or a system external to the circuit verification system 100.

At 520 of the method 500, an annotated circuit design is generated by the data preparation engine 110 based on the circuit design 532 and a constraint file (e.g., the constraint file 134). In one example, the data preparation engine 110 generate the annotated design file based on the LVS result database 136 and the constraint file 134. The LVS result database 136 includes a list of previously identified polygons. In one example, with reference to FIG. 6, the polygon 610 is associated with the net name gnd!. Within the generated the annotated design file, the polygon 610 is associated with the net name 1. The polygon 620 is associated with the net name A0, and in the annotated design file, the polygon is associated with the net name 37.

At 520 of the method 500, the polygons of the circuit design are mapped to the annotated circuit design by the data preparation engine 110. In example, the polygons of a circuit design are mapped to the annotated circuit design based on a cross-reference file. The cross-reference file defines net cross-reference and layer mapping information between the circuit design 132 (e.g., the original circuit design) and the annotated circuit design. In one or more examples, a cross-reference file includes a net cross-reference file, an annotated design file, and/or a layer mapping file. In one example, a cross-reference file indicates that the polygon net1 is annotated by "1" in the annotated circuit design. Further, the cross-reference file indicates that the polygon net2 is annotated by "2", the polygon B1 is annotated by "18", and the polygon A1 is annotated by "19" in the annotated circuit design. Further, a layer mapping file indicates that the layer M1 of is annotated by "14" in the annotated circuit design, the layer M2 is annotated by "15" in the annotated circuit design, and the layer M3 is annotated by "16" in the annotated circuit design.

At 540 of the method 500, the polygons are queried from the annotated design by the data preparation engine 110. A region query (RQ) is performed to obtain polygons which are defined in the constraint file from the annotated design. The polygons are saved as the polygon collections 220 within the memory 130.

In one or more examples, a ML model and a ML process to perform one or more of 320, 330, and 340 of the method 300 and/or 520, 530, and 540, of the method 500. For example, layouts of a plurality of circuit designs may be collected over time and used to train an ML model to be used during the method 300 and/or 500. For the layout design of each circuit design, a specific DRC rule deck file based on the DRC rule deck template and design data is generated by the data preparation engine 110 using the trained ML model. In one example, for each schematic and layout design, a specific LVS runset of a LVS runset template and design data are generated. In one example, the generated rule-decks/runsets are used to train the ML model. If the generated rule-deck/runset is incorrect, the defects are also used to train the ML model.

Figure 6:
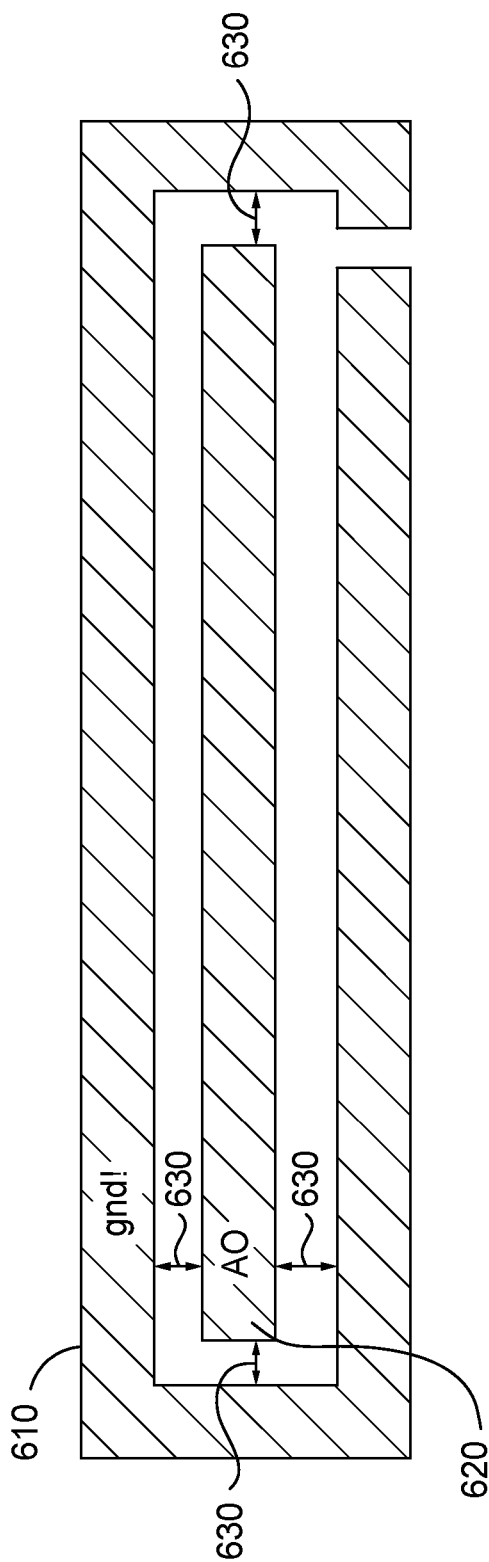
FIG. 6 illustrates a portion of an example circuit design, according to one or more examples.

FIG. 6 illustrates a portion of a layout of the circuit design 132. As illustrated in FIG. 6, the circuit design 132 includes polygons 610 and 620. The netted shape 610 is the polygon gnd! and the netted shape 620 is the polygon A0. The netted shape 610 is separated from the netted shape 620 by a shielding distance 630. As is described in further detail in the following, the shielding distance 630 may be defined by a design rule.

In one or more examples, the method 300 identifies the netted shape 610 as the polygon gnd! and the netted shape 620 as the polygon A0 and stores the polygons gnd! and A0 in a result file within the memory 130.

In one or more examples, the polygon 610 is included within a first polygon collection (e.g., the polygon collection $220_1$), and the polygon 620 is included within a second polygon collection (e.g., the polygon collection $220_2$) using the method 300 or the method 500.

Figure 7:
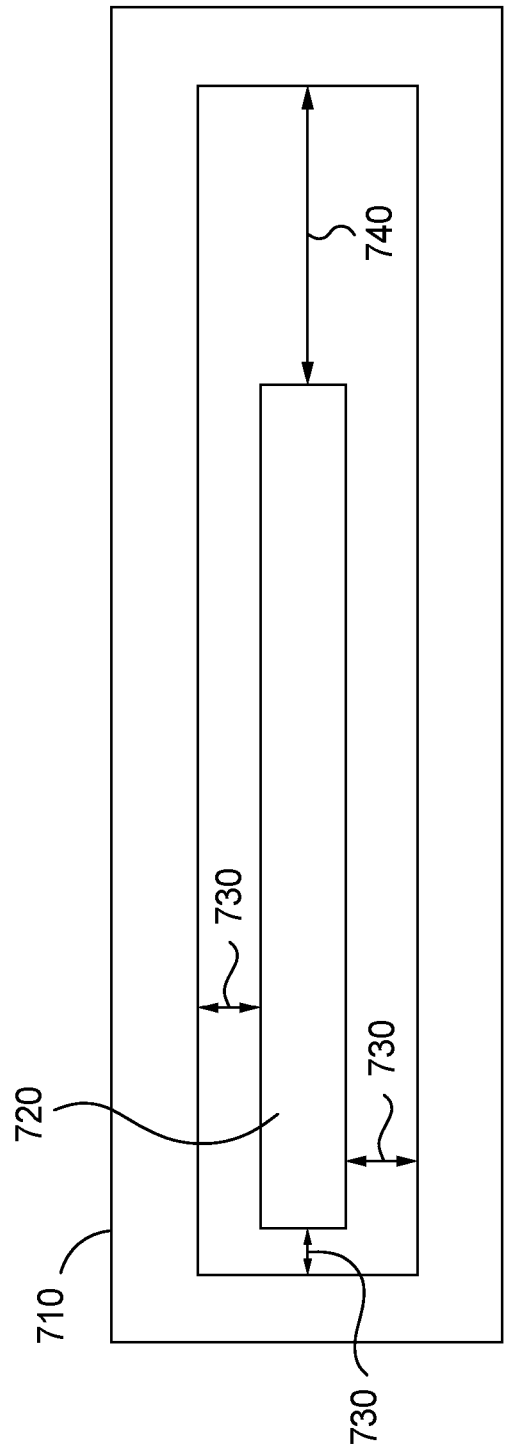
FIG. 7 illustrates a portion of an example circuit design, according to one or more examples.

FIG. 7 illustrates a portion of a circuit design (e.g., the circuit design 132) including a polygon 710 and a polygon 720. The polygon 710 is determined to part of a first polygon collection (e.g., the polygon collect $220_1$ of FIG. 2) and the polygon 720 is determined to part of a second polygon collection (e.g., the polygon collection $220_2$ of FIG. 2) based on the method 300 or 500. The polygon 720 is separated from the polygon 710 by the shielding distance 730 along three sides and the distance 740 along one side. The distance 740 is greater than the shielding distance 730. Further, as compare to the polygon 610 of FIG. 6, the polygon 710 of FIG. 7 is continuous (e.g., does not contain any gaps).

Figure 8:
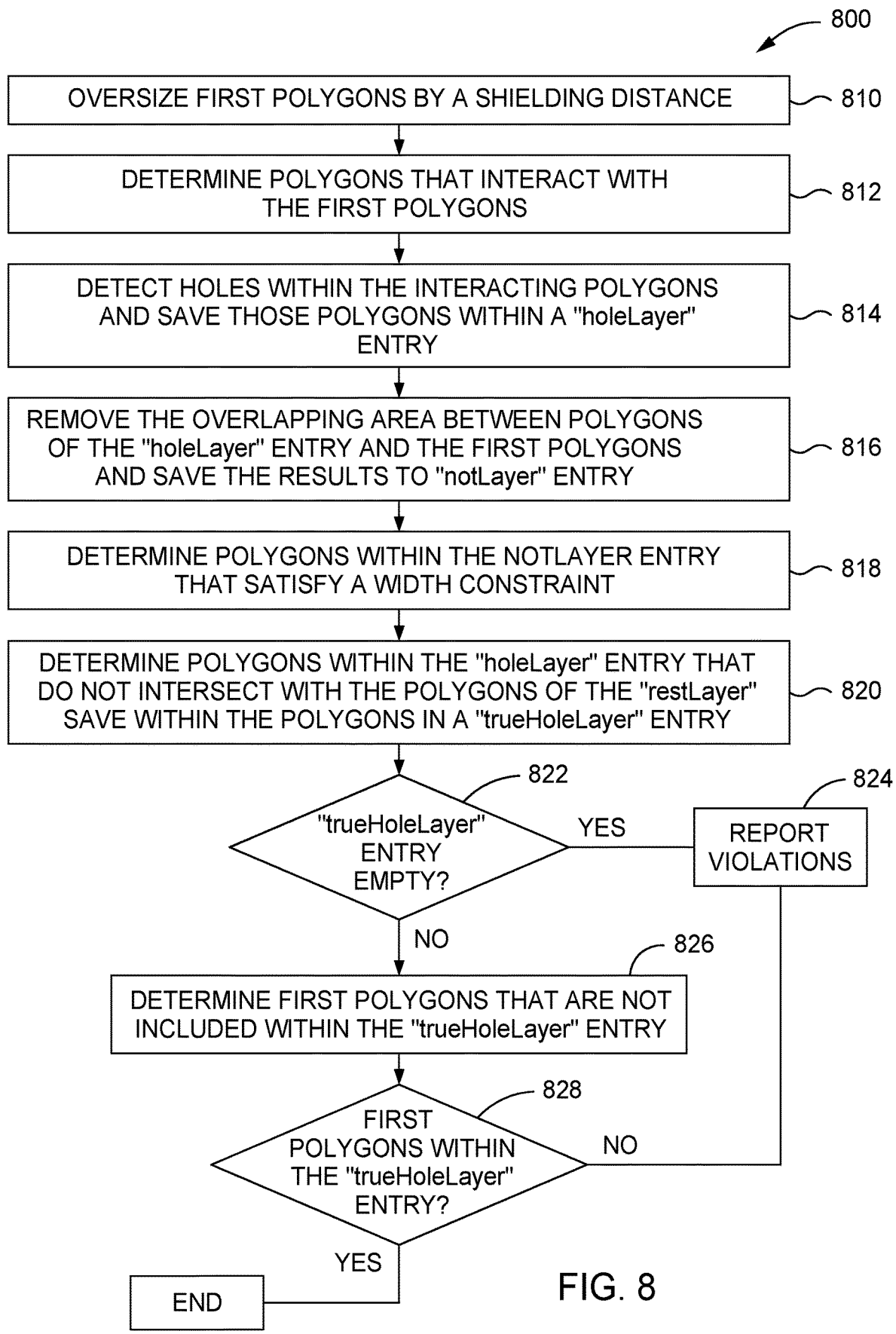
FIG. 8 illustrates a flowchart of a method for verifying a circuit design, according to one or more examples.

FIG. 8 illustrates a flowchart of a method 800 for detecting violations within a circuit design, according to one or more examples. The method 800 is performed by the rules checking engine 120. For example, one or more processors of the rules checking engine 120 executes instructions stored within a memory to perform the method 800. The method 800 is performed based on the polygon collections 220 generated by the method 300 and method 500.

At 810 of the method 800, one or more polygons are oversized based on a shielding distance by the rules checking engine 120. For example, one or more of polygons of one or more of the polygon collections 220 (e.g., the polygon collection $220_1$) is uniformly oversized (grown) by a shielding distance (shield-distance) by the rules checking engine 120. The rules checking engine 120 obtains the polygon collections 220 from the memory 130. In one example, a "size" command is performed by the rules checking engine 120. In one example, two or more of the rule checking units 240 are used to uniformly oversize the polygons of a respective polygon collection 220. The oversized polygons are saved as within a sizeLayer entry within the memory 130. In one example, with reference to FIG. 6, the polygon 620 is oversized based on the shielding distance 630. Further, with reference to FIG. 7, the polygon 720 is oversized based on the shielding distance 730.

At 812 of the method 800, interacting polygons are determined from the polygon collections 220 by the rules checking engine 120. In one example, the oversized polygons of the sizeLayer entry in the memory 130 are compared to the polygons of one or more of the polygon collections 220 to determine which of the polygons overlap (e.g., interact) with the oversized polygon or polygons. In one or more examples, the rules checking engine 120 selects polygons from the polygon collection $220_2$ that having an intersection with the polygons in the sizeLayer entry within the memory 130. With reference to FIG. 6, the oversized (resized) version of the polygon 620 is compared to the polygon 610 to determine whether or not the two polygons interact with each other. With reference to FIG. 7, the oversized version of the polygon 720 is compared to the polygon 710 to determine whether or not the two polygons interact with each other. In one example, based on the determination that the polygon 610 interacts with the oversized polygon 620, the polygon 610 is saved within an interactLayer entry within the memory 130. Further, based on the determination that the polygon 710 interacts with the oversized polygon 720, the polygon 710 is saved within an interactLayer entry within the memory 130.

At 814 of the method 800, holes are detected within the interacting polygons. For example, the rules checking engine 120 analyzes the interacting polygons within interactLayer entry within the memory 130 to determine if holes are present within the interacting polygons. In one or more examples, the rules checking engine 120 extracts polygons from the interactLayer that comprise holes and places those polygons within a holeLayer entry within the memory 130. In one example, a hole rule checking command is used by the rules checking engine 120 to determine which polygons are holes.

At 816 of the method 800, the overlapping area between polygons of the holeLayer entry and the first polygons is removed and results are saved within a notLayer entry by the rules checking engine 112. For example, the polygons saved within the holeLayer entry within the memory 130 are compared to the first polygons (e.g., the polygon collection $220_1$) to detect an overlapping area between the polygons. The overlapping area is removed, forming modified polygons as a result. The modified polygons are saved to the notLayer entry within the memory 130. In one example, the rules checking engine 112 performs a Boolean-not command to remove the overlapping area as described above.

At 818 of the method 800, polygons within the notLayer entry within the memory 130 that satisfy a width constraint are determined by the rules checking engine 112. The width constraint is greater than a shielding distance threshold. For example, the width constraint is greater than a shielding distance 630 of FIG. 6, or a shielding distance 730 of FIG. 7. In one example, the rules checking engine 112 performs a notWidth command to determine the polygons within the notLayer entry that satisfy the width constraint. In one or more examples, the rules checking engine 112 selects all regions of polygons in the notLayer entry that satisfy the width constraint. The polygons that satisfy the width constraint are saved within a restLayer entry within the memory 130.

At 820 of the method 800, polygons of the holeLayer that do not intersect with the polygons of the restLayer are determined by the rules checking engine 120. For example, the polygons of the holeLayer are compared to the polygons of the restLayer to determine which of the polygons of the holeLayer are not included within the polygons of the restLayer. The detected polygons are saved as within a trueHoleLayer entry within the memory 130.

At 822 of the method 800, a determination as to whether or not the trueHoleLayer entry is empty is determined by the rules checking engine 120. If, at 822 of the method 800, the trueHoleLayer entry is determined to be empty (e.g., not include polygons), violations are reported at 824 by the rules checking engine 120. If, at 822 of the method 800, the trueHoleLayer entry is determined to include one or more polygons (e.g., not to be empty), the rules checking engine 120 selects polygons of the first polygons that are not included within the trueHoleLayer entry at 826 of the method 800. Polygons of the first polygons (e.g., the polygon collection $220_1$) not determined to be within the trueHoleLayer entry are selected and stored within a notInsideLayer entry within the memory 130. In one example, the rules checking engine 120 performs a Boolean-not inside command to select polygons from the first polygons (e.g., polygon collection $220_1$) that have no intersection with the polygons in the trueHoleLayer entry, and save those polygons to the notInsideLayer entry.

If, at 828 of the method 800, the first polygons are determined to be enclosed by the polygons of the trueHoleLayer entry, the method 800 ends. If, at 828, the first polygons are determined to not be enclosed by the polygons of the trueHoleLayer entry, the method 800 proceeds to 824 of the method 800, and violations are reported. In one or more examples, the violations may corresponds to shielding distance violations.

In one or more example, the method 800 of FIG. 8 may be used to compare the polygons of two or more of the polygon collections $220_2$-$220_N$ to the polygons of the polygon collection $220_1$ during at least partially overlapping periods in time. In one example, a first rules checking unit $240_1$ may perform the method 800 with regard to polygon collections $220_1$ and $220_2$, and a second rules checking unit $240_2$ may perform the method 800 with regard to polygon collections $220_1$ and $220_3$ during at least partially overlapping periods in time.

Figure 9:
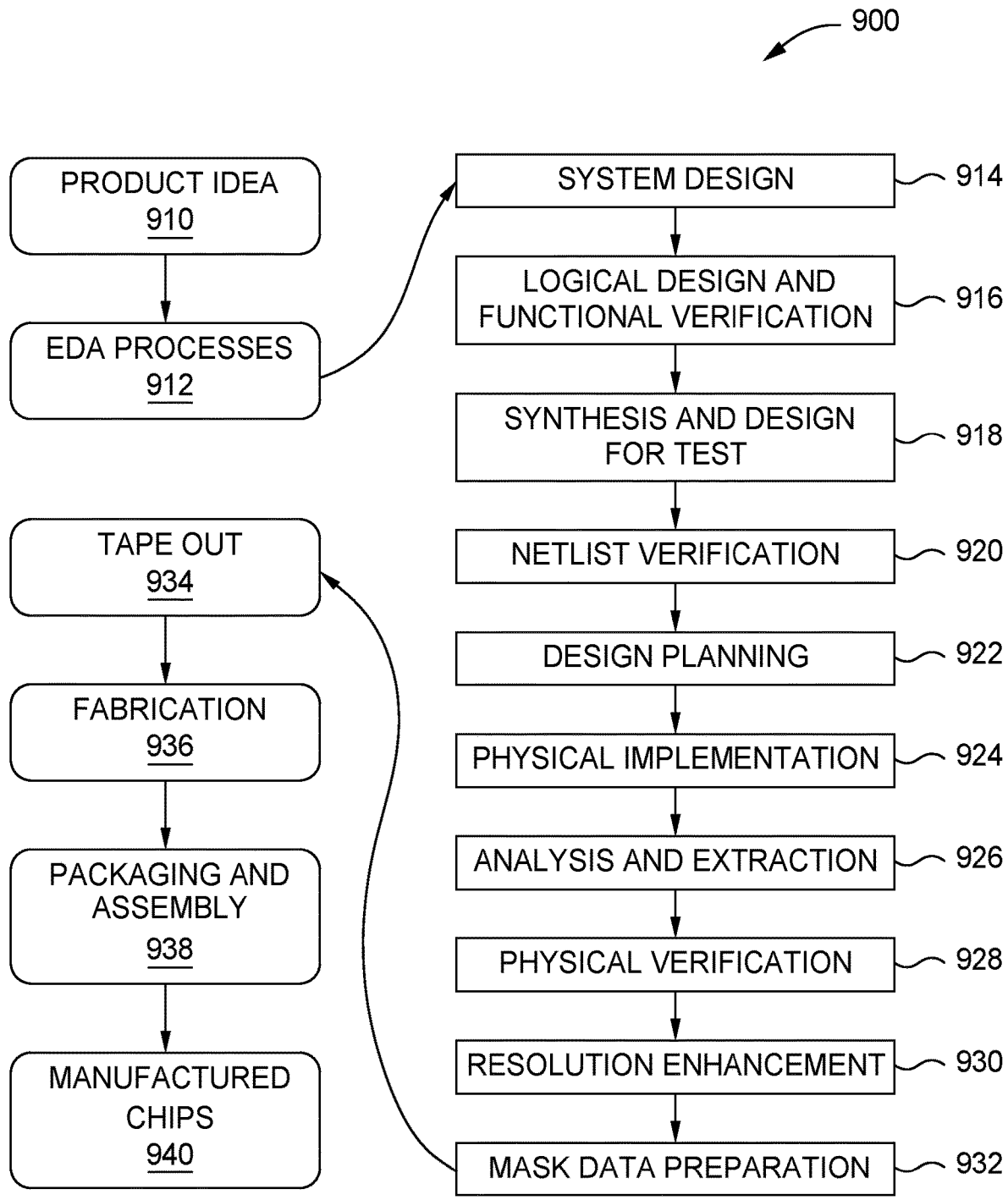
FIG. 9 depicts a flowchart of various processes used during the design and manufacture of an integrated circuit in accordance with some embodiments of the present disclosure.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly processes 938 are performed to produce the finished integrated circuit 940.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 9. The processes described by be enabled by EDA products (or EDA systems).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

In one or more examples, the methods 200, 300, 500, and 700 may be implemented as part of logical design and functional verification 916, synthesis and design for test 918, and/or netlist verification 920.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1000 of FIG. 10) may be used to store the programs and data structures that are used by some or all of the EDA products described herein, and products used for development of cells for the library and for physical and logical design that use the library.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
obtaining a circuit design comprising a plurality of polygons;
determining, by one or more processors, a shape of a first polygon of the plurality of polygons and a shape of a second polygon of the plurality of polygons based on a first mapping that maps the plurality of polygons to corresponding polygons of an annotated circuit design and a second mapping that maps layers of the circuit design to layers within the annotated circuit design, wherein the shape of the first polygon differs from a shape of the second polygon; and
detecting, by the one or more processors, violations within the circuit design based on a comparison of the first polygon with the second polygon.

2. The method of claim 1 further comprising generating a plurality of polygon collections based on the shape of the first polygon and the shape of the second polygon, wherein a first polygon collection of the plurality of polygon collections is associated with the shape of the first polygon and a second polygon collection of the plurality of polygon collections is associated with the shape of the second polygon.

3. The method of claim 2 further comprising:
determining a shape of a third polygon of the plurality of polygons, the shape of the third polygon is the same as the shape of the first polygon; and
grouping the third polygon within the first polygon collection.

4. The method of claim 1 further comprising detecting a shape of each of the plurality of polygons based on a label associated with each of the plurality of polygons and a ruleset defining a location of the plurality of polygons within the circuit design based on the labels.

5. The method of claim 1 further comprising:
determining the first mapping; and
determining the second mapping.

6. The method of claim 1, wherein determining the shape of the first polygon and the shape of the second polygon is further based on constraints indicating a relationship between the plurality of polygons, the layers within the circuit design, and design rules.

7. The method of claim 1, wherein detecting the violations within the circuit design based on the comparison of the first polygon with the second polygon comprises:
oversizing the first polygon;
determining that the second polygon interacts with the oversized first polygon; and
determining that the second polygon comprises one or more holes.

8. The method of claim 7, wherein detecting the violations within the circuit design based on the comparison of the first polygon with the second polygon further comprises:
determining that the first polygon comprises one or more holes.

9. A system comprising:
a memory storing instructions; and
one or more processors, coupled with the memory and configured to execute the instructions, the instructions when executed cause the one or more processors to:
obtain a circuit design comprising a plurality of polygons;
determine a shape of a first polygon of the plurality of polygons and a shape of a second polygon of the plurality of polygons based on a first mapping that maps the plurality of polygons to corresponding polygons of an annotated circuit design and a second mapping that maps layers of the circuit design to layers within the annotated circuit design, wherein the shape of the first polygon differs from a shape of the second polygon; and
detect, by the one or more processors, violations within the circuit design based on a comparison of the first polygon with the second polygon.

10. The system of claim 9, wherein the one or more processors are further configured to: generate a plurality of polygon collections based on the shape of the first polygon and the shape of the second polygon, wherein a first polygon collection of the plurality of polygon collections is associated with the shape of the first polygon and a second polygon collection of the plurality of polygon collections is associated with the shape of the second polygon.

11. The system of claim 10, wherein the one or more processors are further configured to:
determine a shape of a third polygon of the plurality of polygons, the shape of the third polygon is the same as the shape of the first polygon, wherein the third polygon is grouped within the first polygon collection.

12. The system of claim 9, wherein the one or more processors are further configured to detect a shape of each of the plurality of polygons based on a label associated with each of the plurality of polygons and a ruleset defining a location of the plurality of polygons within the circuit design based on the labels.

13. The system of claim 9, wherein the one or more processors are further configured to:
determine the first mapping; and
determine the second mapping.

14. The system of claim 9, wherein determining the shape of the first polygon and the shape of the second polygon is further based on constraints indicating a relationship between the plurality of polygons, the layers within the circuit design, and design rules.

15. The system of claim 9, wherein detecting the violations within the circuit design based on the comparison of the first polygon with the second polygon comprises:
oversizing the first polygon;
determining that the second polygon interacts with the oversized first polygon; and
determining that the second polygon comprises one or more holes.

16. The system of claim 15, wherein detecting the violations within the circuit design based on the comparison of the first polygon with the second polygon further comprises:
determining that the first polygon comprises one or more holes.

17. A non-transitory computer readable medium comprising stored instructions, which when executed by a processor, cause the processor to:
obtain a circuit design comprising a plurality of polygons;
determine a plurality of polygon collections based on shapes of the plurality of polygons, each of the plurality of polygon collections is associated with a different one of the shapes;

determine first polygons of a first polygon collection of the plurality of polygon collections that interact with one or more polygons of a second polygon collection of the plurality of polygon collections by oversizing the one or more polygons of the second polygon collection and determining that the first polygons of the first polygon collection interact with the oversized one or more polygons; and determine a violation within the circuit design based on determining that the first polygons are free of holes.

18. The non-transitory computer readable medium of claim 17, wherein determining the plurality of polygon collections comprises:

determining a shape of a first polygon of the plurality of polygons;

determining a shape of a second polygon the plurality of polygons;

determining a shape of a third polygon of the plurality of polygons, the shape of the third polygon is the same as the shape of the first polygon; and associating the first polygon and the third polygon with the first polygon collection and the second polygon with the second polygon collection.

19. The non-transitory computer readable medium of claim 18, wherein the processor is further caused to:

determine a first mapping that maps the plurality of polygons to corresponding polygons of an annotated circuit design; and determine a second mapping that maps layers of the circuit design to layers within the annotated circuit design, wherein determining the shape of the first polygon and the shape of the second polygon is based on the first mapping and the second mapping.

20. The non-transitory computer readable medium of claim 19, wherein determining the plurality of polygon collections based on the shapes of the plurality of polygons is further based on constraints indicating a relationship between the plurality of polygons, the layers within the circuit design, and design rules.

* * * * *